United States Patent [19]
Taylor et al.

[11] Patent Number: 5,711,190
[45] Date of Patent: Jan. 27, 1998

[54] WEIGHT COMPENSATING METHOD AND APPARATUS

[75] Inventors: Gary R. Taylor; Shaughan Holden, both of Calgary, Canada; Anton Gasafi, deceased, late of Calgary, Canada, by Jane Karabonik, legal representative

[73] Assignee: ETI Technologies Inc., Guernsey, Channel Islands

[21] Appl. No.: 476,203

[22] Filed: Jun. 7, 1995

Related U.S. Application Data

[63] Continuation of Ser. No. 175,320, Dec. 29, 1993, abandoned, which is a continuation of Ser. No. 887,340, May 21, 1992, abandoned.

[51] Int. Cl.$^6$ .................................................. F16F 15/22
[52] U.S. Cl. ........................ 74/573 R; 74/572; 74/573 F
[58] Field of Search ................................... 74/572–574

[56] References Cited

U.S. PATENT DOCUMENTS

| | | |
|---|---|---|
| 1,314,005 | 8/1919 | Louden . |
| 2,103,643 | 12/1937 | Salomon . |
| 2,285,404 | 6/1942 | Best . |
| 2,331,756 | 10/1943 | Zobel . |
| 2,518,226 | 8/1950 | Drake . |
| 2,771,240 | 11/1956 | Gurin . |
| 2,958,165 | 11/1960 | Hoffman . |
| 2,984,094 | 5/1961 | Balaieff . |
| 3,164,413 | 1/1965 | Salathiel . |
| 3,248,967 | 5/1966 | Lewis ..................................... 74/573 F |
| 3,282,127 | 11/1966 | Deakin . |
| 3,316,021 | 4/1967 | Salathiel . |
| 3,316,413 | 4/1967 | Yellott . |
| 3,339,429 | 9/1967 | Whitlock . |
| 3,410,154 | 11/1968 | Deakin . |
| 3,415,217 | 12/1968 | McGrath . |
| 3,433,534 | 3/1969 | Mercer . |
| 3,464,738 | 9/1969 | Pierce . |
| 3,696,688 | 10/1972 | Goodrich et al. . |
| 3,724,904 | 4/1973 | Nixon et al. . |
| 3,799,619 | 3/1974 | LaBarber . |
| 3,812,724 | 5/1974 | Curtz et al. ........................ 74/573 F X |
| 3,854,347 | 12/1974 | Hellerich . |
| 3,953,074 | 4/1976 | Cox . |
| 4,060,009 | 11/1977 | Wyman . |
| 4,075,909 | 2/1978 | Deakin . |
| 4,269,451 | 5/1981 | Narang ................................ 74/573 R X |
| 4,431,348 | 2/1984 | Powondra . |
| 4,433,592 | 2/1984 | Tatsumi et al. . |
| 4,524,644 | 6/1985 | Pierrat . |
| 4,674,356 | 6/1987 | Kilgore . |
| 4,711,610 | 12/1987 | Riehl . |
| 4,905,776 | 3/1990 | Beynet et al. . |

FOREIGN PATENT DOCUMENTS

| | | |
|---|---|---|
| 202475 | 6/1975 | Argentina . |
| 1180575 | 1/1985 | Canada . |
| 0434270 | 6/1991 | European Pat. Off. . |
| 748909 | 4/1933 | France . |
| 270136 | 7/1989 | Germany . |
| 598097 | 9/1959 | Italy . |
| 49-15266 | 2/1974 | Japan . |
| 49-15268 | 2/1974 | Japan . |
| 52-62977 | 5/1977 | Japan . |
| 52-89270 | 7/1977 | Japan . |
| 54-140064 | 10/1979 | Japan . |
| 58-37353 | 3/1983 | Japan . |

(List continued on next page.)

Primary Examiner—Vinh T. Luong
Attorney, Agent, or Firm—Burns, Doane, Swecker & Mathis, LLP

[57] ABSTRACT

A counterbalancing apparatus for dynamically balancing an out of balance rotating member. A first series of weights having identical size and weight are mounted to freely move within a first groove or race when the apparatus is rotating after being mounted to a shaft or other rotatable member. A second series of weights having identical size and weight are similarly mounted to freely move within a second groove or race located inside of the first groove. The first series of weights is different in size and weight from the second series of weights.

20 Claims, 6 Drawing Sheets

FOREIGN PATENT DOCUMENTS

| | | |
|---|---|---|
| 60-215137 | 10/1985 | Japan . |
| 62-24053 | 2/1987 | Japan . |
| 63-259242 | 10/1988 | Japan . |
| 2-229940 | 9/1990 | Japan . |
| 97059 | 2/1961 | Netherlands . |
| 345322 | 5/1960 | Switzerland . |
| 378068 | 7/1964 | Switzerland . |
| 938041 | 6/1982 | U.S.S.R. . |
| 1048342 | 10/1983 | U.S.S.R. . |
| 1326817 | 7/1987 | U.S.S.R. . |
| 1401307 | 6/1988 | U.S.S.R. . |
| 1572191 | 9/1991 | U.S.S.R. . |
| 1744326 | 6/1992 | U.S.S.R. . |
| 284234 | 6/1928 | United Kingdom . |
| 832048 | 3/1958 | United Kingdom . |
| 93/23687 | 11/1983 | WIPO . |

WEIGHT COMPENSATING METHOD AND APPARATUS

CROSS-REFERENCE TO RELATED APPLICATION

This application is a continuation of U.S. patent application Ser. No. 08/175,320, filed Dec. 29, 1993, now abandoned, which in turn is a continuation of U.S. patent application Ser. No. 07/887,340, filed May 21, 1992, now abandoned, the contents of each of the aforementioned applications being incorporated herein by reference.

INTRODUCTION

This invention relates to a balancing method and apparatus and, more particularly, to a balancing method and apparatus used for dynamically balancing an out of balance condition in a rotating body.

BACKGROUND OF THE INVENTION

Many different apparatuses for balancing an out of balance condition in a rotating body are known. Such apparatuses generally include a counterweight having a weight of a predetermined value which is located at a predetermined position from the axis of rotation to oppose the imbalance in the rotating body. The magnitude of the imbalance is generally known and, accordingly, the necessary weight and position of the counterweight can be calculated so that the weight is positioned where it will act to counter the known imbalance. These apparatuses function satisfactorily for the purposes for which they are employed.

Under dynamic conditions; that is, when a body is rotating about an axis and an imbalance in the rotating body occurs because of external conditions or otherwise, the prior art is much less satisfactorily developed. For example, in a drill bit or in a drillstring, vibration induced forces during operation can create severe unbalances. One technique used to counteract such imbalances is disclosed in U.S. Pat. No. 4,905,776 (Beynet et al). Beynet et al teach a vibration dampening assembly with a plurality of annular grooves or races located about the periphery of the assembly and extending axially therealong. A plurality of balls or rollers are located in each of the races. Such balls or rollers are free to move along the races and thereby counteract the imbalance forces.

A further similar structure is disclosed in U.S. Pat. No. 4,674,356 (Kilgore). Kilgore teaches a plurality of balls freely movable in a race formed in an outer circumferential surface of the body which balls are used to counterbalance an imbalance in the rotating member.

There are, however, disadvantages in such prior art. Although the Beynet et al reference is satisfactory to remove large imbalances from the rotating body, it is difficult to utilise the teachings of Beynet et al where the length of the balancing apparatus is necessarily restricted which is often the case. Likewise, while the teachings of Beynet et al are satisfactory to generally remove large imbalances from the drillstring, there is no provision therein for removing all or most of the remaining imbalance thereafter, particularly the imbalance that may remain when the balls in the races of Beynet et al are located at their optimum positions in the races to counteract the imbalance.

This latter problem is also inherent in the above mentioned Kilgore reference. Kilgore teaches two counterbalance structures, one located at each end of a shaft, to offset the imbalance in the shaft or the unbalanced forces in the rotating structure which is movable with the shaft. If the balls are not located at their optimum positions, the imbalance in the shaft will not be removed.

SUMMARY OF THE INVENTION

According to one aspect of the invention, there is provided a counterbalancing structural member rotatable about an axis, said member comprising first and second annular grooves concentric to said axis and extending around said axis, a first plurality of weights freely movable in said first annular groove, a second plurality of weights freely movable in said second annular groove, said first plurality of weights in said first annular groove being substantially the same weight and size, said second plurality of weights in said second annular groove being substantially the same weight and size, said weight and size of said second plurality of weights being different from said weight and size of said first plurality of weights.

According to a further aspect of the invention, there is provided a method of dynamically balancing a rotating member comprising the steps of positioning a first plurality of weights having the same size and weight in a first annular groove in a rotating structure, positioning a second plurality of weights having the same size and weight and different from the size and weight of said first plurality of weights in a second annular groove in said rotating structure and rotating said structure while allowing free movement of said first and second plurality of weights in said first and second annular grooves.

According to yet a further aspect of the invention, there is provided a method to counter an imbalance in a rotary member comprising the steps of positioning a counterbalance structure on the axis of said rotary member, positioning a first plurality of weights having the same weight and size in a first annular groove located coaxial with said axis and extending about the circumference of said structure, and allowing each of said first plurality of weights to freely move within said first annular groove, positioning a second plurality of weights having the same weight and size in a second annular groove located coaxial with said axis and inside said first annular groove and allowing each of said second plurality of weights to freely move within said second annular groove, said second plurality of weights having a different weight and size from said first plurality of weights.

According to yet a further aspect of the invention, there is provided a method to counter an imbalance in a rotary member comprising the steps of positioning a first half of a structural member having first and second annular grooves with freely movable weights located in each of said annular grooves on a rotary member, positioning a second half of a structural member having third and fourth annular grooves symmetrical with said first and second annular grooves of said first half of said structural member on said rotary member, connecting said first and second halves, rotating said rotary member and allowing said freely movable weights to position themselves within said grooves so as to remove substantially all of said imbalance.

According to yet a further aspect of the invention, there is provided a counterbalancing apparatus comprising a shaft having an outer diameter, at least two grooves formed in said shaft, said grooves being coaxial with the axis of said shaft and formed one inside the other, the outside one of said grooves being inside the outer diameter of said shaft, freely movable weights positioned in each of said grooves and means to retain said weights in said grooves.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1:
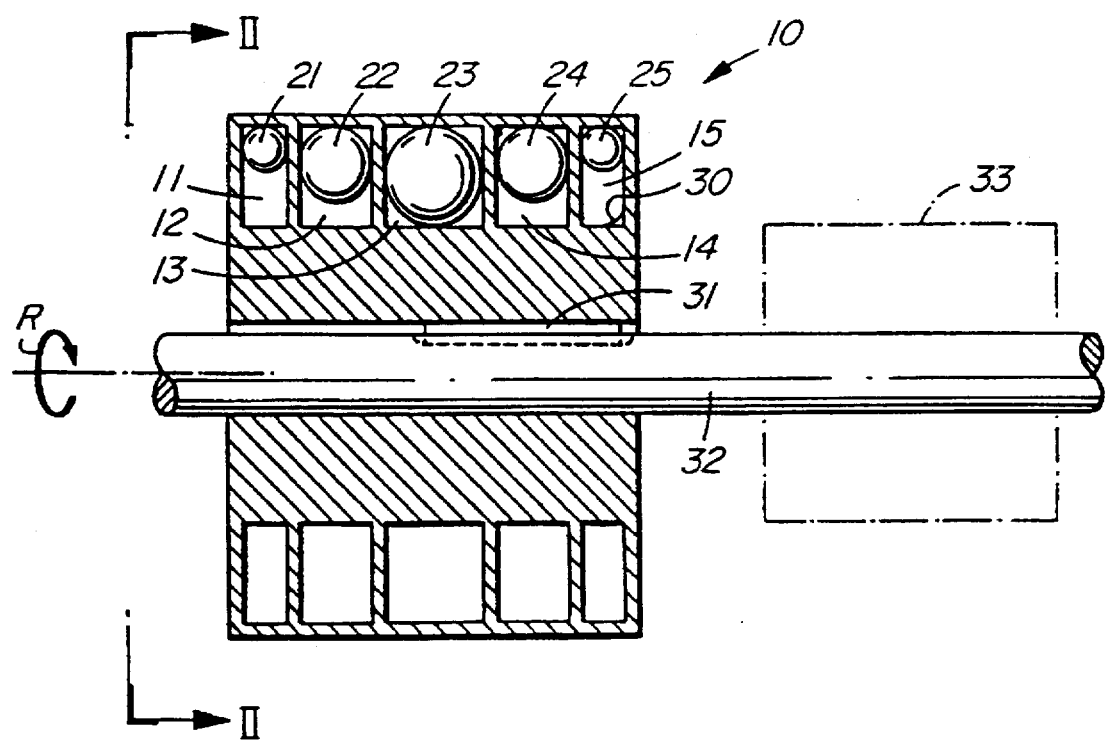
FIG. 1 is a side sectional diagrammatic view of a first embodiment of the counterbalancing apparatus according to the invention.

Referring now to the drawings, a counterbalancing apparatus according to the invention is illustrated generally at 10 in FIG. 1. It comprises a first set of annular grooves 11, 12, 13, 14 and 15, it being understood that oppositely located grooves 11, 15 are conveniently identical and that oppositely located grooves 12, 14 are also conveniently identical.

A plurality of weights 21, 22, 23, 24, 25, conveniently spherical in the form of balls, are mounted in the grooves 11, 12, 13, 14, 15, respectively. The plurality of weights in each of the grooves are all the same size and weight; that is, the weights 21 in groove 11 are all the same size and weight, the weights 22 in groove 12 are all the same size and weight and so on. It is important, however, that the weights in at least two of the grooves be different in size and weight; that is, the weights 23 in groove 13 are preferably larger and heavier than the weights 24 in groove 14.

The balls 21, 22, 23, 24, 25 are freely movable in their respective grooves 11, 12, 13, 14, 15 about the circumference of the counterbalancing apparatus 10. A silicon lubricant 30 is added to the counterbalancing apparatus 10 in order to reduce the friction between the balls and their respective races or grooves and to also reduce the noise made by the balls when the counterbalancing apparatus is in operation as will be described hereafter.

The balls 21, 22, 23, 24, 25 are manufactured from a hardened material such as carbide. Likewise, the races or grooves 11, 12, 13, 14, 15 are hardened. The hardening is desirable in order to retard or prevent the formation of "flats" on the balls or races which tend to reduce the ability of the balls to move freely within the grooves or races and thereby retard the effectiveness of the counterbalancing movement of the balls.

OPERATION

In operation, the counterbalancing apparatus 10 is installed on shaft 32 so as to fixedly rotate therewith such as by using a key 31 between the apparatus 10 and the shaft 32. The operation of an unbalanced member generally illustrated at 33, which creates an out of balance condition, is initiated and shaft 32 rotates with member 33 and counterbalancing apparatus 10 as illustrated.

As an out of balance condition originates within member 33, the balls 21, 22, 23, 24, 25 in each of the grooves 11, 12, 13, 14, 15 move and act to counterbalance the out of balance condition.

It is difficult to precisely state the principle by which the balls are known to move and while it is believed that empirical data will subsequently lead to formulae and better understanding to predict the optimal behaviour of the counterbalancing apparatus 10, the following explanation is given with the expectation that further information presently not known will amplify, modify or change such explanation.

It is believed that the larger balls 23 in groove 13 will remove the larger out of balance condition in member 33. The somewhat smaller balls 22, 24 in grooves 12, 14 will act to remove the somewhat smaller out of balance condition in member 33. Finally, the smallest balls 21, 25 in grooves 11, 15 will act to remove the smallest out of balance condition in member 33. Thus, the entire out of balance condition in member 33 is removed by "fine tuning"; that is, by removing the imbalance under dynamic conditions with a plurality of different sized balls positioned in separate grooves which balls optimally remove different degrees of imbalance.

Figure 2:
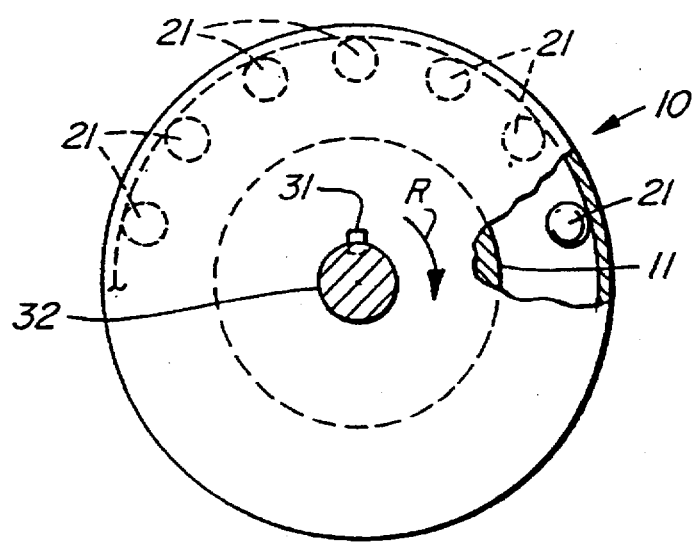
FIG. 2 is an end view taken along II—II of FIG. 1.

With reference to FIG. 2 which illustrates the leftmost groove 11 of FIG. 1 with the balls 21 in a representative and dynamic balanced position offsetting the unbalance in member 33, as viewed with a timing light adjusted for appropriate shaft r.p.m., it has been found that the optimum behaviour for the balls 21 occurs when they do not contact each other in the dynamically balanced position as is illustrated. It has been found that when many of the balls 21 come into contact with each other, the balancing phenomenum is not optimal and modification of the counterbalancing apparatus 10 may be necessary by way of structural or weight changes.

The embodiment of the invention illustrated in FIGS. 1 and 2 is conveniently used when there is a large potential imbalance problem in member 33 under dynamic operating conditions. If the potential imbalance problem in member 33 is small, the number of grooves and associated balls therein can be reduced to as few as two (2), with all of the balls in each respective groove being the same size and weight and the balls of the first groove being different in size and weight from the balls of the second groove, the former balls acting to remove the large imbalance and the latter balls acting to remove a smaller remaining imbalance.

Figure 3:
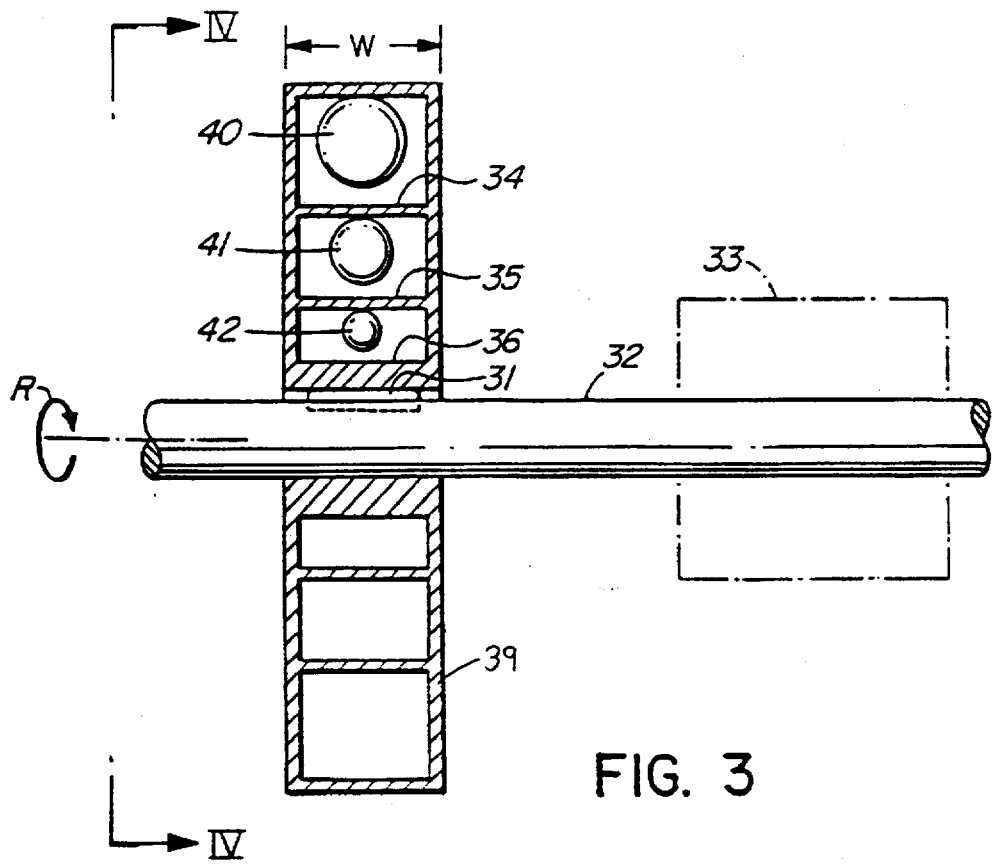
FIG. 3 is a side sectional diagrammatic view of a second embodiment of the counterbalancing apparatus according to the invention.
Figure 4:
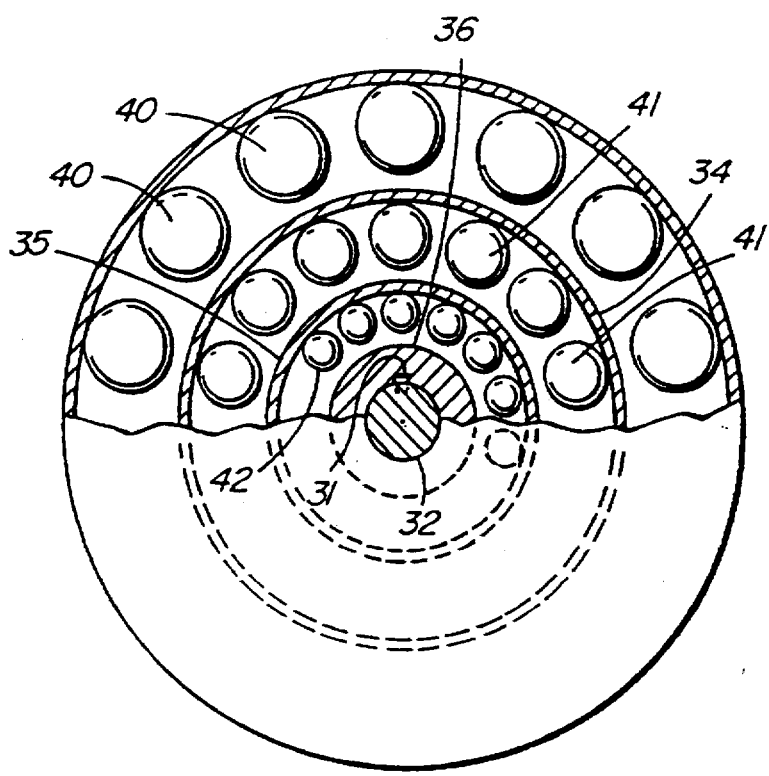
FIG. 4 is an end view taken along IV—IV of FIG. 3.

Referring now to FIGS. 3 and 4, there is illustrated a further embodiment which is desirable when the width "W" as illustrated in FIG. 3 is limited. In this embodiment, there are three grooves or races 34, 35, 36 with balls 40, 41, 42 mounted therein, respectively. The grooves or races 34, 35, 36 are located in an enclosing structure 39. The races or grooves 36, 35, 34 define first, second and third annular and continuous races. 34, 35, 36, respectively, with the first race 36 containing the balls 40 constituting a plurality of first weights, the second race 35 containing the balls 41 constituting a plurality of second weights and the third race 34 containing the balls 42 constituting a plurality of third weights. The balls 40 in groove 34 are all the same size and weight. The balls 41 in groove 35 are likewise all the same size and weight and the balls 42 in groove 36 are likewise all the same size and weight. The balls 40 in groove 34, however, are larger and heavier than the balls 41 in groove 35 which, in turn, are larger and heavier than the balls 42 in groove 36. Under operating conditions and when an imbalance occurs in member 33 during rotation of shaft 32, the balls 40, 41, 42 will assume positions which counter the imbalance. A representative view of the positions of balls 40, 41, 42 illustrated in FIG. 4 would be positions where the imbalance is removed optimally; that is, and as earlier described, the balls in each race or groove do not contact each other.

Figure 5:
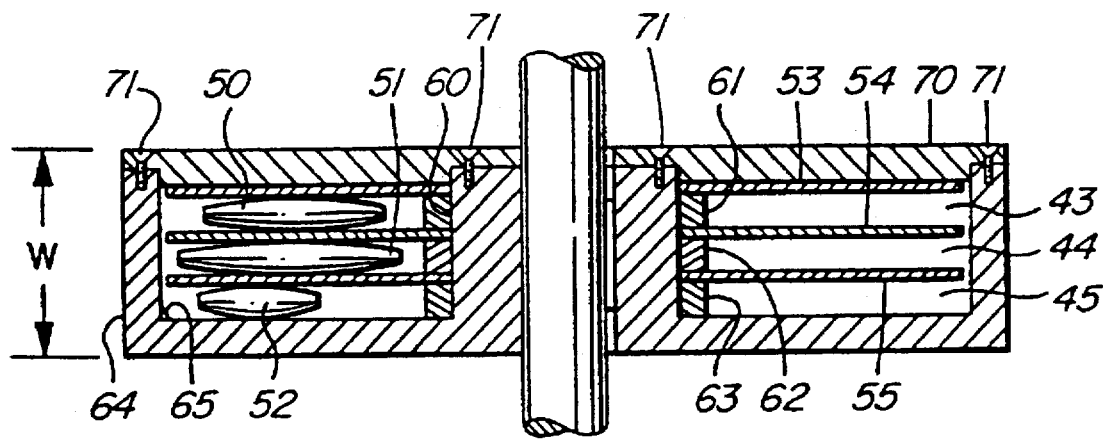
FIG. 5 is side sectional view of yet a further embodiment of the counterbalancing apparatus according to the invention.

A further embodiment of the invention is illustrated in FIG. 5. In this embodiment, wherein the width "W" is again of concern, a first plurality of cylindrical disc-like weights 50, 51, 52 are positioned to be freely movable in each of the grooves 43, 44, 45 which grooves 43, 44, 45 are formed by circumferential dividers 53, 54, 55 which are positioned over hub 60 and between spacers 61, 62, 63. A silicon lubricant 65 is added to the interior of the housing 64 and a closure member 70 is connected to the housing 64 by the use of cap screws 71.

In operation, the housing 64 is fixedly mounted on the rotating shaft 32 as described in association with the method of FIG. 1. As an imbalance arises in member 33, the cylindrical weights 50, 51, 52 will freely move within the grooves 43, 44, 45 until they assume a position wherein they counterbalance the imbalance occurring in the member 33. It has been found that it is preferable to give the sides of the cylindrical disks 50, 51, 52 a slight bow in order that the discs 50, 51, 52 contact the dividers 53, 54, 55 with a minimal surface area wherein they are not influenced by any possible suction which might otherwise occur between the dividers 53, 54, 55, the silicon lubricant 65 used and the discs 50, 51, 52 of the FIG. 5 embodiment. It is preferable that the cylinders or discs 50, 51, 52 move as freely as possible within the grooves 43, 44, 45 between the dividers 53, 54, 55 as is likewise true for the weights and balls of the FIGS. 1 and 3 embodiments.

Figure 6:
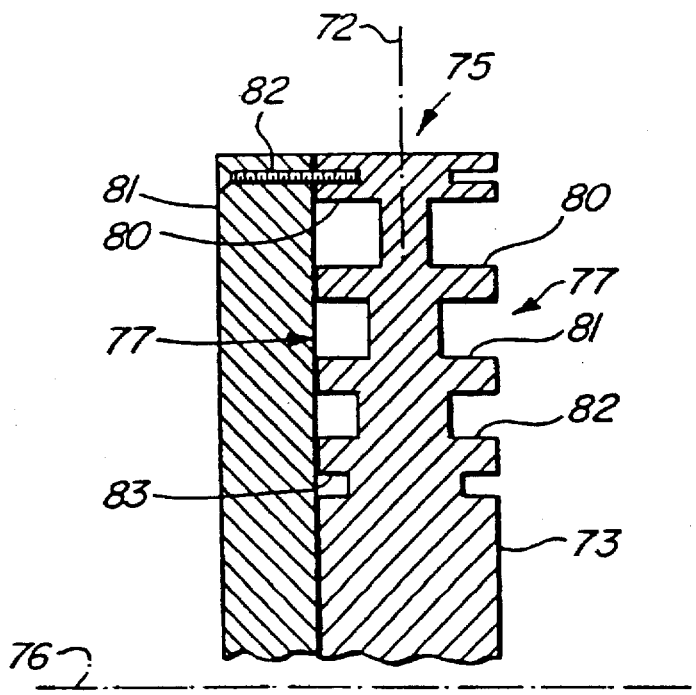
FIG. 6 is a side sectional diagrammatic view of yet a further embodiment of the counterbalancing apparatus according to the invention.
Figure 7:
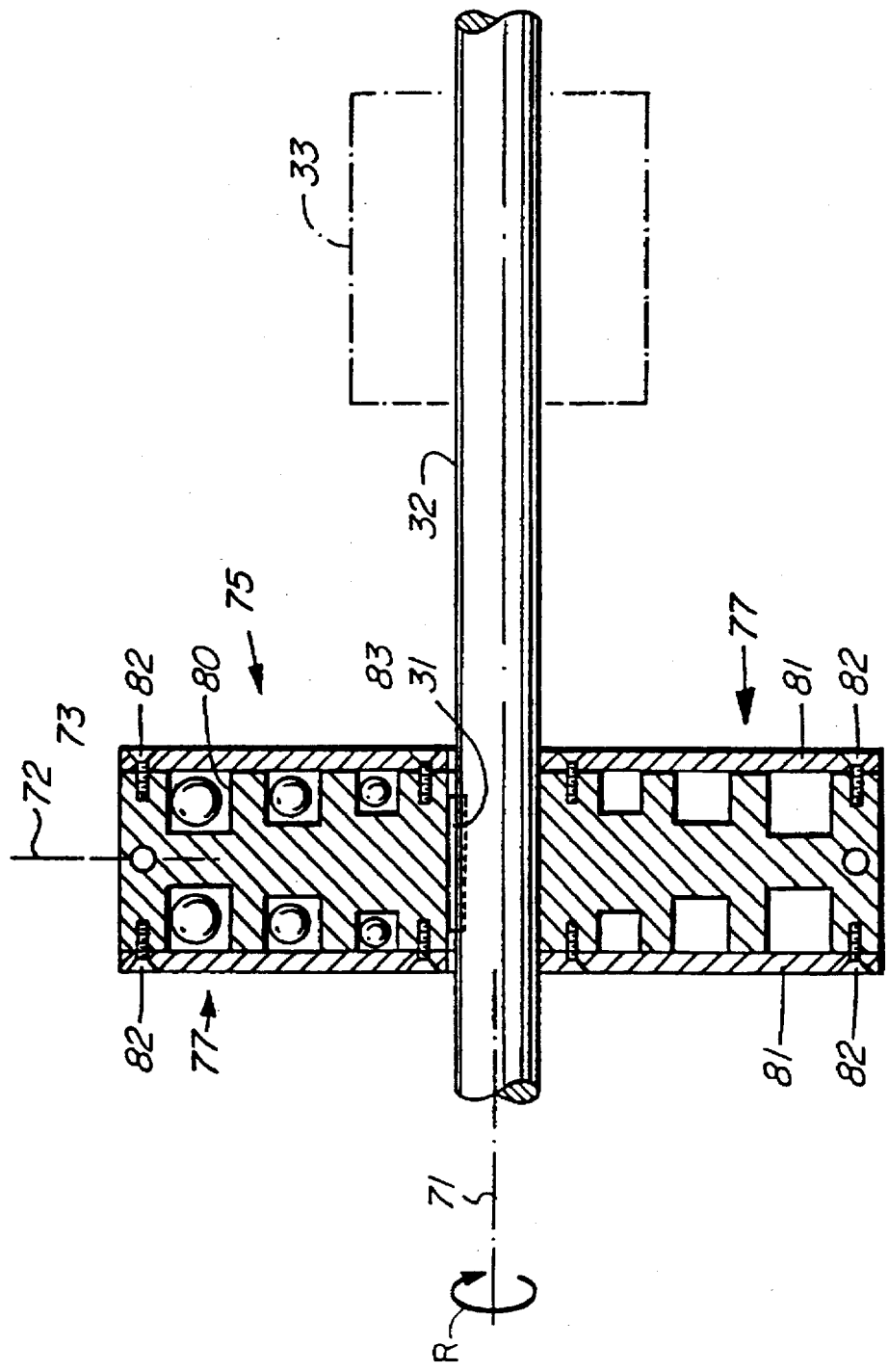
FIG. 7 is a side sectional diagrammatic view of the apparatus of FIG. 6 illustrated in its operating position.

Yet a further embodiment of the invention is illustrated in FIGS. 6 and 7, FIG. 6 illustrating four (4) grooves or races and FIG. 7 illustrating only three (3) grooves or races. In this embodiment, the counterbalancing apparatus generally illustrated at 75 is symmetrical about both axes 76, 72 and is mounted to a shaft 32 similar to the FIG. 1 embodiment.

In this embodiment, however, a central circumferential member 73 made from a solid piece of material is machined with a plurality of annular grooves generally illustrated at 77 on both faces. Balls (FIG. 7) are mounted in the grooves 80, 81, 82, 83, the balls mounted in the outermost groove 80 being the largest and the balls in the innermost groove 83 being the smallest. After providing the silicon lubricant within each of the grooves 77, two end plates 85 are mounted to the central circumferential member 73 by the use of cap screws 86. The operation is similar to the operation of the FIG. 3 embodiment; that is, when an imbalance occurs in member 33, the balls in each groove will assume a position wherein the imbalance is removed.

It is not again presently known why such is the case, but it has been found that seven (7) balls or weights in each groove or annular space of each of the embodiments appear to be an optimal number. It is, however, also believed that a greater or smaller number of balls or weights would usefully serve to remove various imbalances under various operating conditions.

A rule of thumb has arisen which has been helpful to the applicant in its current product development. It has been found that the quantity of the imbalance that may be potentially removed from an out of balance member by the counterbalancing apparatus is the sum of the weights in each of the grooves or races of the counterbalancing apparatus.

Figure 8A:
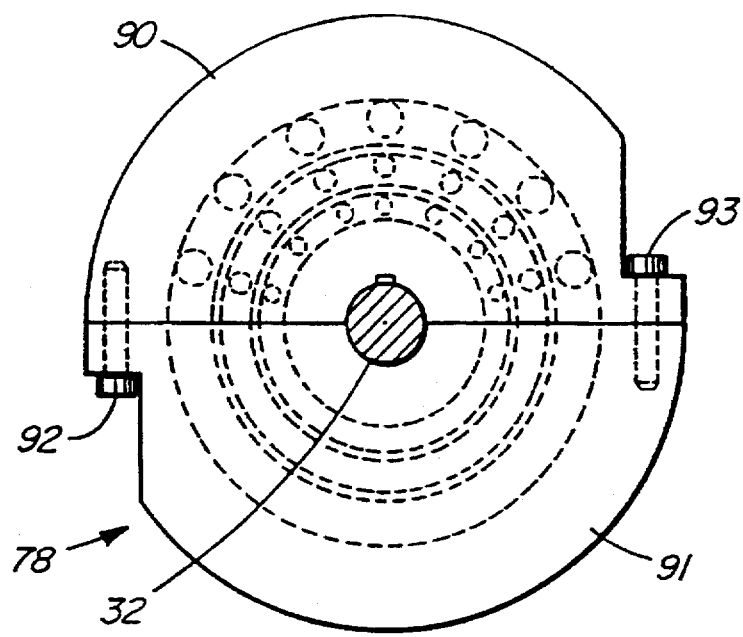
FIGS. 8A and 8B are end views of a further embodiment of the invention mounted about a shaft and illustrating the counterbalancing apparatus in assembled and disassembled condition about the shaft, respectively.
Figure 8B:
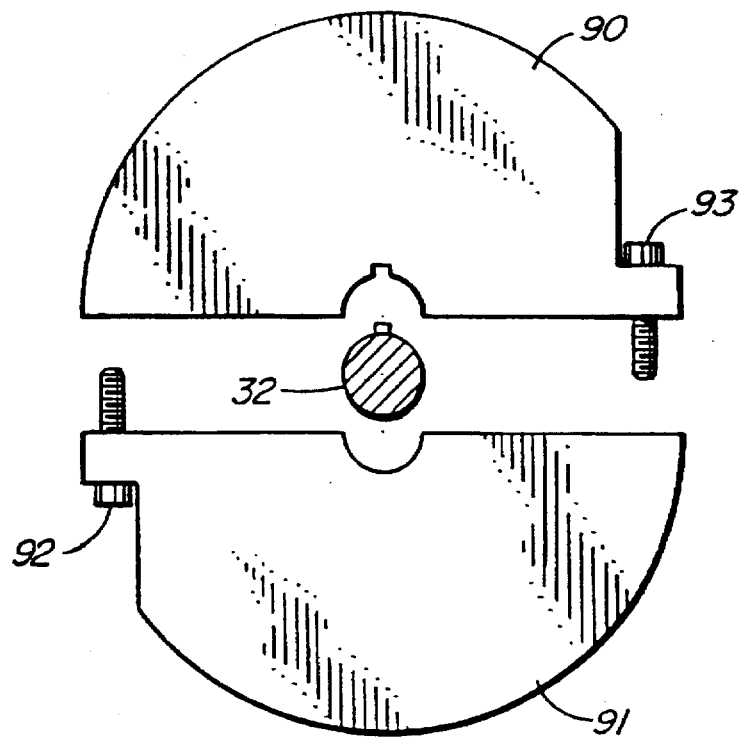

A further embodiment of the invention is illustrated in FIGS. 8A and 8B. In this embodiment, the counterbalancing apparatus 78 according to the invention is illustrated as being made from two sections 90, 91, which sections are mounted about shaft 32 by cap screws 92, 93 and which sections 90, 91 are freely removed from shaft 32 by removing the cap screws 92, 93. This embodiment is particularly useful where minimal modifications are desirably made to the rotating shaft 32 or to the out of balance member 33. Rather, the counterbalancing apparatus 78 is simply connected to the shaft 32 at a position where it is possible so to attach the counterbalancing apparatus 78 and the cap screws 92, 93 are tightened to firmly couple the apparatus 78 to the shaft 32.

Figure 9:
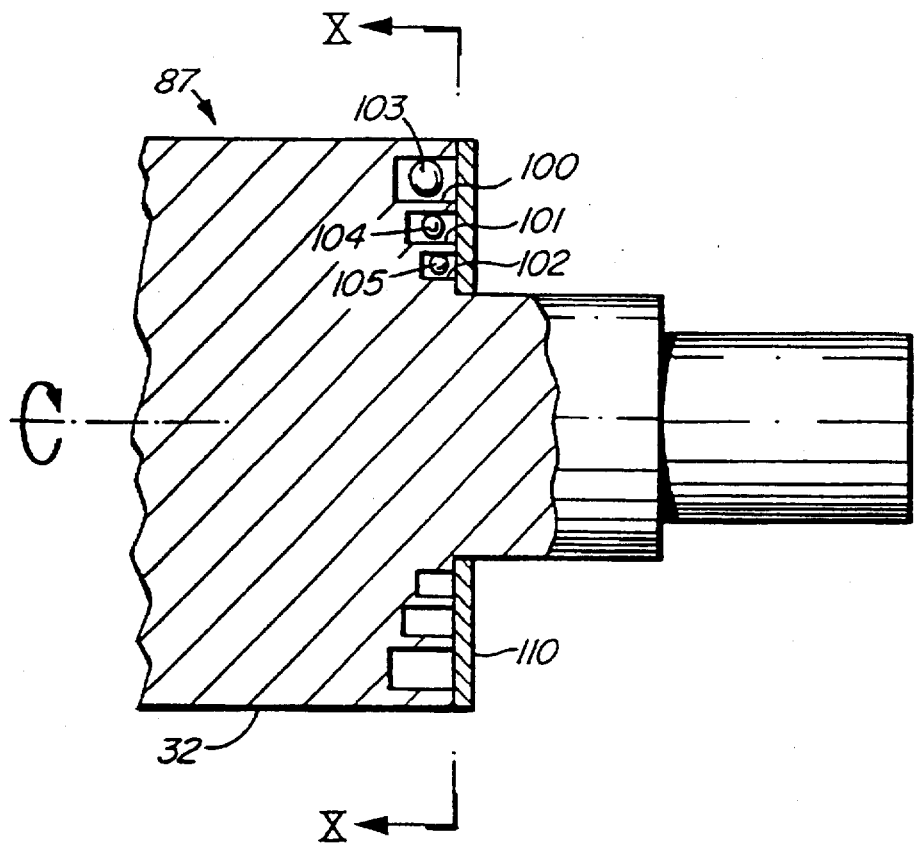
FIG. 9 is a diagrammatic side view of yet a further embodiment, the counterbalancing apparatus according to the invention being operably located within a shaft.
Figure 10:
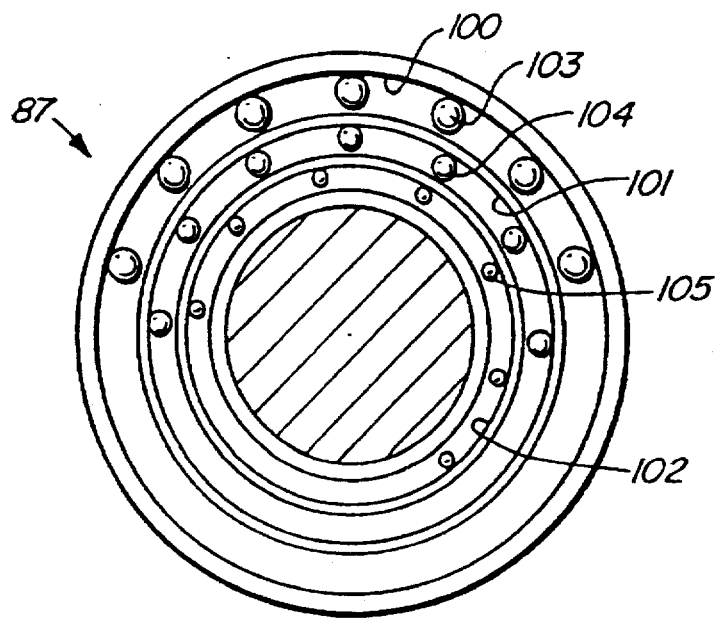
FIG. 10 is a diagrammatic end view taken along X—X of FIG. 9 illustrating a representative position of the movable weights during rotation of the shaft in which the apparatus is located.

Yet a further embodiment is illustrated in FIGS. 9 and 10. In this embodiment, it is contemplated that the counterbalancing apparatus 87 is mounted inside the outer circumference of a rotating shaft 32. As illustrated in FIG. 9, the grooves or races 100, 101, 102 are machined directly into the solid material of shaft 32 and the balls 103, 104, 105 are positioned directly therein for free movement relative thereto. A cover 110 is connected to the shaft 32 and the balls 103, 104, 105 are thereby retained. In operation, as an out of balance condition occurs either in the out of balance member 33 (FIG. 1) or in shaft 32 itself, the balls 103, 104, 105 will orient themselves in a configuration such as the configuration illustrated in FIG. 10. In such positions, the shaft 32 and/or the unbalanced member 33 is balanced by the position of the balls 103, 104, 105 under dynamic operation conditions.

While it is presently anticipated that the counterbalancing apparatus according to the invention be made from a metallic material, it is also contemplated that other materials may well be appropriate such as composite material structures and plastic or the like, depending on the operating conditions under which the counterbalancing apparatus is intended to function.

While specific embodiments of the invention have been described, such embodiments should be considered as illustrative of the invention only and not as limiting its scope as defined in accordance with the accompanying claims.

What is claimed is:

1. The combination of a rotatably driven shaft that is adapted to be rotatably driven about a rotational axis and an imbalance removing device provided on the shaft for rotating with the shaft and removing imbalance, the imbalance removing device comprising an enclosing structure provided with a first annular and continuous race, and a second annular and continuous race, the first annular race being separate from the second annular race and having an axis that is coaxial with the rotational axis of the shaft, the second annular race having an axis that is coaxial with the rotational axis of the shaft, a plurality of first weights positioned in the first annular race for movement within the first annular race, the plurality of first weights being arranged in a single annular row within the first race, each of the plurality of first weights possessing a weight that is substantially the same as the weight of each of the other plurality of first weights, a plurality of second weights positioned in the second annular race for movement within the second annular race, the plurality of second weights being arranged in a single annular row within the second race, each of the plurality of second weights possessing a weight that is substantially the same as the weight of each of the other plurality of second weights, the weight of each of the plurality of first weights being different from the weight of each of the plurality of second weights.

2. The combination according to claim 1, wherein the entire second annular race is disposed radially outwardly of the first annular race.

3. The combination according to claim 2, wherein each of the plurality of second weights possesses a weight that is greater than the weight of each of the plurality of first weights.

4. The combination according to claim 1, wherein each of the plurality of second weights possesses a weight that is greater than the weight of each of the plurality of first weights.

5. The combination according to claim 1, wherein said first annular race is axially spaced from the second annular race.

6. The combination according to claim 5, wherein each of said plurality of second weights possesses a weight that is greater than the weight of each of the plurality of first weights.

7. The combination according to claim 1, including a third annular and continuous race in the enclosing structure, and a plurality of third weights positioned in the third annular race for movement within the third annular race, the plurality of third weights being disposed in a single annular row within the third annular race, the third race having an axis that is coaxial with the rotational axis of the shaft.

8. The combination according to claim 7, wherein each of the plurality of third weights possesses a weight that is substantially the same as the weight of each of the other plurality of third weights.

9. The combination according to claim 8, wherein each of the plurality of third weights possesses a weight that is different from the weight of each of the plurality of second weights.

10. The combination according to claim 9, wherein each of the plurality of third weights possesses a weight that is different from the weight of each of the plurality of first weights.

11. The combination according to claim 7, wherein each of the plurality of third weights possesses a weight that is greater than the weight of each of the plurality of first weights.

12. The combination according to claim 11, wherein each of the plurality of third weights possesses a weight that is greater than the weight of each of the plurality of second weights.

13. The combination according to claim 7; wherein the entire third annular race is disposed radially outwardly of the first annular race.

14. The combination according to claim 13, wherein the entire third annular race is disposed radially outwardly of the second annular race.

15. The combination according to claim 1, wherein each of the plurality of first and second weights is a sphere.

16. Imbalance removing device for removing imbalance in a rotatable shaft having a rotational axis, comprising an enclosing structure, a first annular and continuous race disposed in the enclosing structure, a second annular and continuous race disposed in the enclosing structure, the first annular race being separated from the second annular race, the first annular race and the second annular race being concentric, a plurality of first weights positioned in the first annular race for movement within the first annular race, the plurality of first weights being arranged in a single annular row within the first race, a plurality of second weights positioned in the second annular race for movement within the second annular race, the plurality of second weights being arranged in a single annular row within the second race, the weight of each of the plurality of first weights being different from the weight of each of the plurality of second weights.

17. Imbalance removing device according to claim 16, wherein each of said plurality of second weights possesses a weight that is greater than the weight of each of the first plurality of weights.

18. Imbalance removing device according to claim 17, wherein the entire second annular race is disposed radially outwardly of the first annular race.

19. Imbalance removing device according to claim 17, wherein each of the plurality of second weights possesses a weight that is substantially the same as the weight of each of the other plurality of second weights, each of the plurality of first weights possessing a weight that is substantially the same as the weight of each of the other plurality of first weights.

20. Imbalance removing device according to claim 16, including a third annular and continuous race in the enclosing structure, and a plurality of third weights in the third annular race, the plurality of third weights being disposed in a single annular row within the third annular race, each of the plurality of third weights possessing a weight that is substantially the same as the weight of each of the other plurality of third weights, the third race being concentric with the first and second races.

* * * * *